Feb. 12, 1935.  J. L. H. HAND  1,990,939
SYSTEM FOR COMPENSATING A NAVIGATIONAL COMPASS
Filed Dec. 15, 1926  2 Sheets-Sheet 1
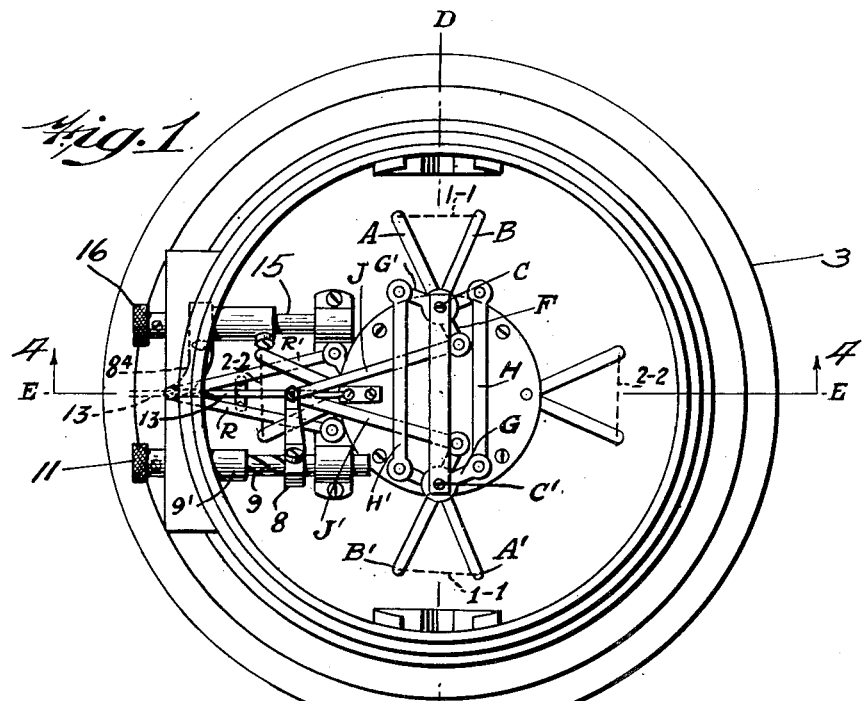
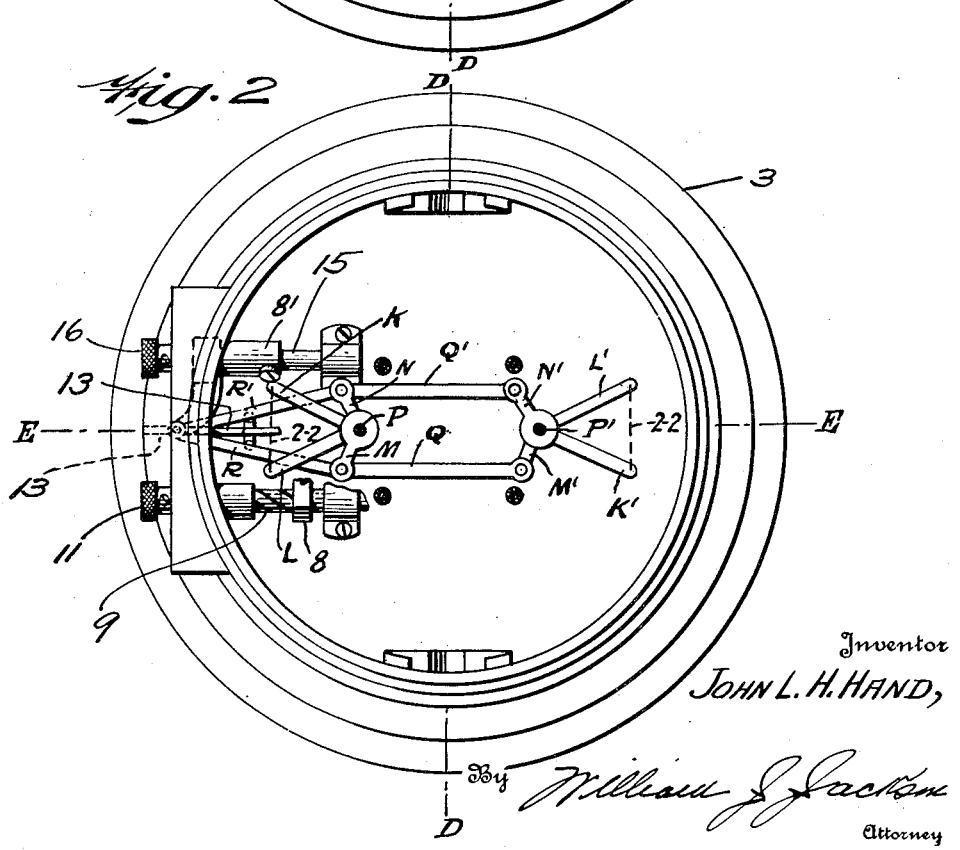
Inventor
JOHN L. H. HAND,
By William J. Jackson
Attorney

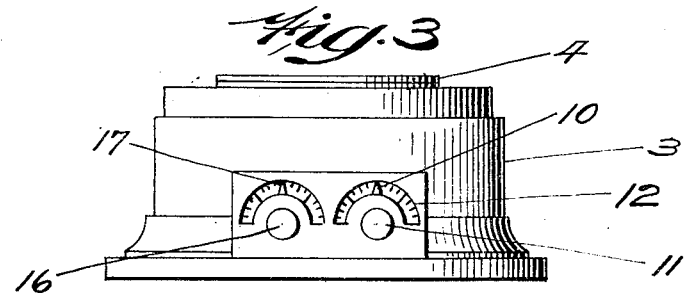
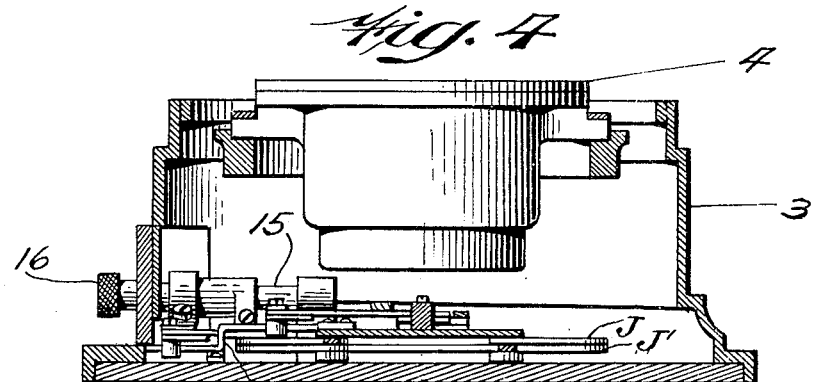
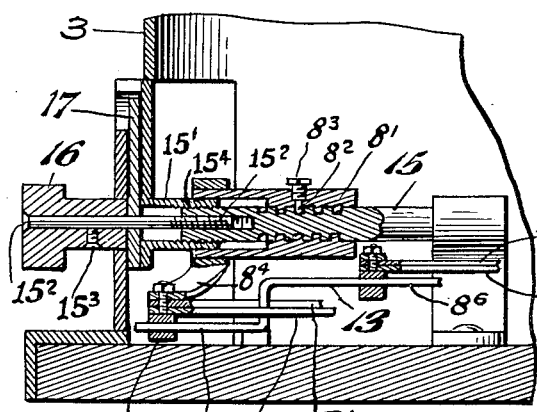
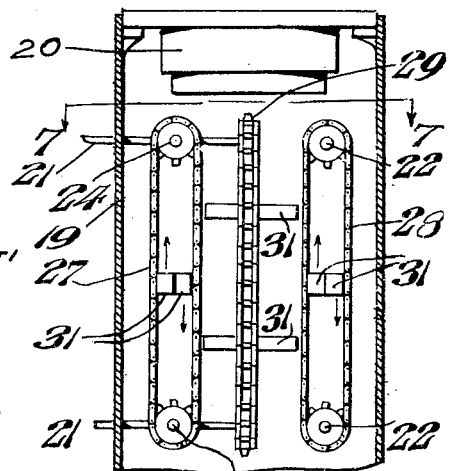
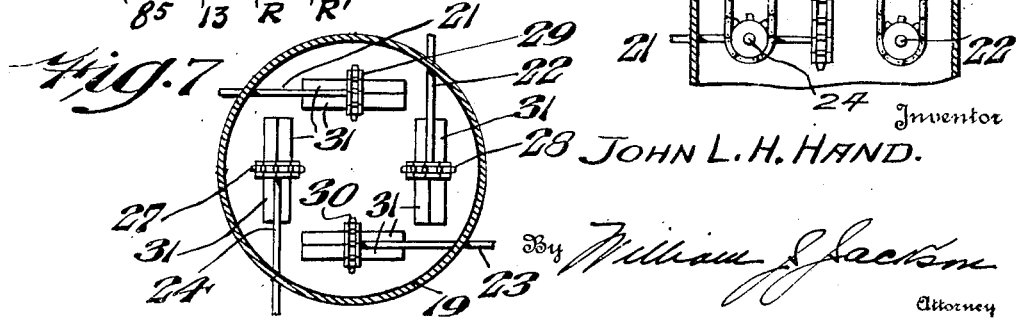

Patented Feb. 12, 1935

1,990,939

UNITED STATES PATENT OFFICE 1,990,939

SYSTEM FOR COMPENSATING A NAVIGATIONAL COMPASS

John L. H. Hand, Philadelphia, Pa.

Application December 15, 1926, Serial No. 154,885

18 Claims. (Cl. 33—225)

My invention relates to a method and apparatus for neutralizing distortions in the earth's magnetic field at a compass due to the permanent field from a carrier of the compass and comprises a device for adjustably modifying a field at a point distant from the device in definite directions with respect to the device, usually in relatively perpendicular directions in the plane of a compass.

A purpose of my invention is to variably magnetically couple magnetic poles of unlike polarity in order to adjust a magnetic field at a point distant from the poles.

Magnetic coupling in the sense in which it is used in this specification can only exist between poles of unlike polarity and here means a pairing of magnetic poles of unlike polarity so that the magnetic flux of each flows wholly or partially through the other.

The coupling of the unlike poles results in a neutralization of the magnetic effect of the poles at the distant point, as at the compass, to an extent that is variant with variation in the coupling. The magnetic effect of the poles at the distant point is least when the coupling between the poles is greatest, that is when the magnetic flux flows most directly and most completely from one pole to the other, and increases as the coupling between the poles becomes less perfect.

A further purpose is to arrange sets of adjustably coupled magnetic poles so as to produce at a distant point, as at a compass, fields respectively perpendicular to one another and individually adjustable by adjusting the coupling of the poles in the individual sets.

I vary the coupling between the magnetic poles by varying the magnetic reluctance between them, as by relative movement of the poles, and preferably make the variation of magnetic reluctance (usually due to variation in relative position of the poles) one not affecting the direction of the field at the distant point. The relative movement of the coupled magnetic poles may be that due to relative angular or rectilinear adjustment of suitable magnet members, either or both.

Usually I maintain each pole of a coupled pair of poles at the same distance from an axis through the compass as the other and also in practice each pole at the same distance as the other from vertical fore and aft and athwart planes through the compass.

A further purpose is to provide a corrective magnetic system adapted to adjustment with respect to its effect upon a field at a distant point, as at a compass, without changing the center of gravity of the system.

I use magnets in coupled relation and change the coupling without affecting the center of gravity of the system by moving poles of the magnets in opposite directions in any one of several ways. In doing this I may use what are in effect individual magnets jointed in the middle, varying the coupling by opposite simultaneous angular adjustments of the individual limbs of the magnet; or I may use coupled pairs of similar magnets and vary the coupling by opposite simultaneous rectilinear adjustments of the members of the pair, preferably without affecting the center of gravity of the pair considered as a unit.

Further purposes will appear in the specification and in claims.

I have elected to show two only of the many forms of my invention, selecting forms that are practical and efficient in operation and which well illustrate the principles involved.

Figure 1 is a top plan view showing one form of my invention applied to the binnacle of a compass, the compass itself not being shown.

Figure 2 is a view generally similar to Figure 1 but with some of the parts shown in Figure 1 removed.

Figure 3 is a side elevation of Figure 1, showing a compass not shown in Figure 1, in the binnacle.

Figure 4 is a section of Figure 1, taken upon line 4—4 in the direction of the arrows.

Figure 5 is a fragmentary view in section of the left end portion of Figure 4.

Like numerals refer to like parts in all figures.

Describing by illustration and not in limitation and referring to the drawings:

Referring to the form shown in Figures 1 to 5, two magnetic sets, each of one or more pairs of coupled magnets may be employed. The magnets of the two sets are designated at 1 and 2 respectively and the sets are adapted to modify the field at the compass in relatively perpendicular directions, as fore and aft and athwart a ship.

The pairs of magnets are shown exactly alike so that description of one pair applies to all.

The magnets are contained within the compass casing or binnacle 3 in a plane below the compass 4. Two magnets A and B of the same size, shape and quality are magnetically paired, that is are placed in coupled relation to one another, so that they present their unlike poles toward one another, and the magnetic flux of each passes partially or wholly through the other. When the poles of one magnet are in actual contact with the unlike poles of the other the coupling is substantially perfect in that the poles then exert no appreciable field at the compass.

In the illustration the magnets A and B are kept in continuous contact with one another at their inner ends C and their outer ends are adapted to be adjusted simultaneously in opposite directions along an arc about their pivotal inner ends and maintain equal distances from the fore and aft and athwart lines D—D and E—E respectively of the ship, or other carrier of the compass. These lines should be suitably marked upon the binnacle as indicated in Figures 1 and 2.

The pairs of each set of adjustably coupled poles are preferably spaced at the same distances from and on opposite sides of an axis through the compass and during adjustment move simultaneously in a way to maintain substantial relative symmetry of the pairs with respect to relatively perpendicular vertical planes through the center of the binnacle, planes which usually are made to coincide with the fore and aft and athwart lines of the carrier.

When the distance along the dotted lines 1—1 or 2—2 between coupled poles increases the magnetic coupling between the poles is less perfect because of increase in magnetic reluctance between the poles, and the magnetic field between the poles spreads out in vertical planes through the lines 1—1 or 2—2 and more strongly affects the field at the compass, the effect of a coupled pair at the compass being horizontal in the direction of the vertical planes through the dotted lines 1—1 or 2—2 through the adjustably spread poles, increasing as the free ends of the magnets move further apart and decreasing when they are brought together.

The field produced by either set at the compass is of opposite direction if the direction of spreading of the poles is reversed, the field being in one direction if the north pole moves to the right and the south pole to the left, and in the other direction if the north pole moves to the left and the south pole to the right, and in practice I make the coupled pairs adapted to adjustment in both directions.

I am thus able to create magnetic effects at the compass in relatively perpendicular directions of any desired degree by suitably varying the extent of opening of the free ends of the poles of the magnets 1 and 2, varying the spread of the paired magnets 1 creating at the compass a changing magnetic effect parallel to the lines 1—1, and varying the spread of the paired magnets 2 creating at the compass a changing magnetic effect parallel to the lines 2—2. The lines 1—1 and 2—2 are relatively perpendicular, being respectively parallel to the lines E—E and D—D which are suitably athwart and fore and aft lines of the carrier, directionally variant with the magnetic meridian of the earth, according to the directional alignment of the carrier.

I prefer to use four coupled pairs of magnets, two pairs to each set, all the magnets being arranged in a horizontal plane below the compass, and placed so that the sets of pairs of magnets are at right angles to each other and along fore and aft and athwart ship lines in the binnacle.

It will be understood that the magnetic effect at the compass from varying the spread of the magnets designated 1 introduces an effect at the compass in a direction parallel to the athwart lines 1—1 and extending over a fairly broad athwart field both intermediate vertical planes through the laterally spaced parallel athwart lines 1—1 and in both directions outside of the space between these planes. In the same way the adjustment of the magnets designated 2 of the other set results in a change in the field in the direction of the fore-and-aft dotted lines, 2—2, and over a correspondingly broad fore and aft strip wider than the spacing between the dotted lines 2—2.

While I prefer to provide each set with spaced magnets upon opposite sides of the axis of the compass it will be understood that this is in many cases not essential and that in the illustrated structure the paired magnets A' and B' or/and the paired magnets K' and L' might in many cases be omitted, and whether or not the omission may interfere with the adaptation of the device to correct the magnetic field of the carrier of the compass at the compass will be dependent upon a number of factors, principally upon the distance of the corrector magnets from the magnets of the compass and upon the spacing and dimensional characteristics of the magnets of the compass.

The rods J and J' are connected with a system of levers that operate the magnets designated 1. The rods J and J' in turn are connected to a member 8 having cooperative relation with a screw 9 extended outside the binnacle and having an index hand 10 and knob 11. The screw 9 and its parts are fitted in proper relation to a dial 12 which is suitably graduated and bears instructions for use.

It will be seen that magnets A and A' are rigidly fastened to bell cranks F and F', respectively, which are operatively connected by links H and H' to rockers G and G' respectively that respectively carry the magnets B' and B.

The magnets designated 2 are operated in nearly the same way as the magnets designated 1 and comprise cooperating pairs of magnets K and L and K' and L' respectively having free relatively adjustable unlike poles of equal strengths at the lines 2—2. The magnets K and L pivot at their adjacent inner poles being mounted upon rockers M and N that have a common pivot support at P and make link connections Q and Q' with rockers M' and N' that are pivoted at P' and respectively carry the magnets K' and L'. The magnet assembly designated 2 is adjusted by the links R and R' between the rockers M and N and an arm 8⁴ from the nut 8'.

The adjustment of the sets of magnets 1—1 is effected by the knob 11 and that of the set of magnets 2—2 by the knob 16.

The knob 11 is in rigid connection with the indicator 10, that moves over the dial 12 and to a sleeve 9' that is rigidly fastened to the outer end of the screw 9.

In the same way the knob 16 is in rigid connection with the indicator 17, and the screw 15.

Mechanism of both adjustments at the knobs 11 and 16 is substantially the same except that the nut members 8 and 8' respectively are located differently longitudinally of the turn screws 9 and 15 in order to accommodate for the difference in the positions of the outer ends of the links J and J' and of the links R and R' respectively.

This structure is shown in detail in Figures 4 and 5, the indicator 17 is clamped between the inwardly presented shoulder of the head 16 and the outwardly presented shoulder of the sleeve 15' by means of a central screw 15², locked in clamping position by a screw 15³. The sleeve 15' adjustably threads at 15⁴ upon the more outward position of the screw 15. Angular adjustment of the indicator 17 with respect to its dial 18 is permitted upon loosening the screws 15³ and 15². The nut member 8' carries an inward projection 8² shown as the reduced end of a screw 8³ to mesh in the steep thread of the screw 15 and carries a bracket 8⁴ which extends outwardly to carry and move the outer ends of the links 14.

The nut members 8 and 8' on the screws 9 and 15 are both kept from rotary movement and permitted to move longitudinally by a guide rod 13, the bracket arms sliding along this rod at 8⁵ and 8⁶ respectively.

It will be seen that the rotary movement of the knobs 11 and 16 moves the nut 8 and 8' longitudinally of the threaded screw members 9 and 15 respectively and thereby moves the outer ends of the links 6 or the outer ends of the links 14 to vary the spreading of the coupling magnets 1—1 or 2—2 respectively.

The arrangement shown is one in which the magnet pairs 1 and 1 upon opposite sides of the axis of the binnacle give their outwardly directed poles in a variably coupled relation upon each side of the axis and obviously the inner ends of the two pairs might be magnetically joined without affecting the operation of the system as a whole. In this event the system would in effect comprise two magnets in coupled relation either having flexible ends that are spread variantly to alter the coupling between the poles, or being bodily laterally movable with respect to one another to effect the desired movement of the coupled poles.

In accord with the invention the pairs of unlike poles are equally spaced upon opposite sides of an axis through the compass and the magnets producing the poles are subject to considerable variation as to form and as to location to suit mechanical or space requirements or individual preference, and while I show and prefer two pairs of magnets A and B and A' and B' pivoted at C and C' respectively in effect A and A' and B and B' each comprise an individual magnet, making a single pair of long magnets presenting unlike poles on opposite sides of the axis and laterally adjustable with respect to one another.

In operation each adjustment is in effect an adjustment to zero of an east and west component of the carrier field, the adjustment of one set being made with the compass carrier (for example ship) alined fore and aft with the magnetic meridian and the adjustment of the other set being made with the ship alined fore and aft east and west. Each adjustment is such as to make the compass read right at the given ship alinement.

It will be evident that there is a considerable advantage in my neutralization of the magnets by using each to carry the flux of the other which I prefer to call reciprocation rather than by having opposing poles of magnets turn in the same direction so as to neutralize by what I term opposition.

Neutralization by reciprocation neutralizes by substantial absence of field and, therefore, has the same effect in substantially all compass positions, particularly important when as is most desirable the magnets do not swing with the compass. On the other hand, neutralization by opposition depends upon intensifying the magnets from like poles so that there is one relatively large spot of distinct polarity which neutralizes by dominating the compass magnet, which tends to pull the compass magnet down.

It will be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible to modification in various particulars without departing from the spirit or scope of the invention or sacrificing any of its advantages.

Having thus described my invention what I claim as new and desire to secure by Letters Patent is:

1. The method of using magnetic poles to correct the magnetic field of the carrier of a compass at the compass, which consists in placing a pair of magnets in position such that their unlike poles lie at substantially equal distances from the compass on the same side of the pivotal compass axis and close together so that each pole effectively neutralizes the magnetism of the other pole and that the poles when separated affect the field at the compass in one carrier alignment and in placing a second pair of magnets in position such that their unlike magnetic poles lie at substantially equal distances from the compass on the same side of the pivotal compass axis and close together so that each pole effectively neutralizes the magnetism of the other pole and that the poles when separated affect the field of the compass in a carrier alignment at right angles to the first alignment, in adjusting the separation of the poles of one of the pairs of poles in a direction and to an extent until the compass reads correctly while the carrier is in the first alignment, in changing the alignment of the carrier ninety degrees about the pivotal compass axis, and in adjusting the separation of the other pair of poles in a direction and to an extent until the compass again reads correctly, the poles being maintained at substantially the same equal distances from the compass during the adjustment.

2. The method of correcting field distortion of a carrier at a compass due to the magnetic field at the compass, which consists in initially so placing two magnets in proximity to the compass that each will act as an armature to the other by providing a return path for the magnetic flux of the other when in closely adjacent position, and will thus each help to preserve the strength of the other, in separating one pole only of one magnet from an unlike pole of the other magnet when the compass is in one alignment so as to correct a field at the compass by the effect of the separated poles, the correction increasing with their increased separation, maintaining the distances of the poles from the compass substantially unchanged, in turning the carrier ninety degrees about the pivotal compass axis, in correspondingly placing two other magnets so that each will act as an armature for the other and in separating one pole only of each of the second two magnets from one pole of the other to correct the field at the compass in the new alignment.

3. The method of using a pair of permanent magnets for the purpose of correcting the magnetic field of the carrier of a compass, which consists in pivoting the two magnets near the compass in swinging the magnets on their pivots until poles of opposite polarity substantially coincide to cause the flux from one magnet pole and from the other magnet pole to coincide and thus to nullify upon the compass the effects of both magnet poles, and in swinging the magnets to separate the said poles while keeping them near the compass so as to subject the compass progressively, to different extents, to the magnetic effects of the poles as they are moved, the distances of the poles from the compass being maintained substantially unchanged.

4. The method of using a pair of permanent magnets for the purpose of correcting the magnetic field of the carrier of a compass at the compass, which consists in placing magnets initially in position with one pole of each near to the compass, the two poles being of opposite polarity to cause the flux from one magnet pole to assist the flux from the other magnet pole and thus to nullify upon the compass the effects of both magnet poles, and in separating the said poles to cause them, independently, to affect the compass and at the same time keeping the other poles of the two magnets approximately together, maintaining the distances of the poles from the compass substantially unchanged.

5. In a device for correcting field distortion at a compass, two pairs of similar movable magnets located on opposite sides of the normal vertical axis of the compass and beneath it, and having opposite poles of the magnets within the pair in one adjustment to lie near together so that the two magnets of the pair form armatures for each other, and means for changing the distance of separation of the pole at one end of one magnet from the adjacent pole at the corresponding end of the other magnet in each of the two pairs coincidently and at the same rate of change, whereby the change of the two pairs frees the poles of the two pairs and sets up a field therebetween to act upon the compass.

6. In using a plurality of magnets to vary the magnetic field at a point distant from the magnets, the method which consists in initially placing the magnets in pairs with their unlike poles close together so as to produce a field balanced with respect to the distant point and in separating the unlike poles in one direction or the opposite as required by the character of correction needed, progressively changing the distance of separation of the unlike poles while the distance of one pole from the distant point is constantly kept the same as that of the unlike other pole from the distant point in order to vary the strength and kind of field at the distant point.

7. In a device for correcting field distortion at a compass, two adjustment sets comprising four pairs of magnets located substantially at the same distance from the compass and ninety degrees apart, and having unlike poles within each pair of the four pairs in proximity one to the other and capable of equalizing each other in one position for each pair, with the magnets in the said position extending substantially radially about an extended axis of the compass, and adjustment mechanism for each set for simultaneously adjusting the lateral spacing between the outwardly directed poles of opposite pairs of magnets of the set.

8. The method of using a pair of unlike substantially equal magnetic poles of different magnets to correct the magnetic field of the carrier of a compass with respect to a vertical plane of the carrier through the compass which consists in placing the poles in the said plane substantially equidistant from the compass, in aligning the carrier so that the said plane is at right angles to the magnetic meridian of the earth and in moving the magnets relatively so as to change the horizontal spacing between the poles while maintaining the poles in relative alignments at right angles to the magnetic meridian of the earth and substantially equidistant from the compass until the compass reads correctly.

9. The method of using a pair of unlike substantially equal magnetic poles of different magnets to correct the magnetic field of the carrier of a compass with respect to a vertical plane of the carrier through the compass which consists in placing the poles in the said plane, in aligning the carrier so that the plane aligns with a plane at right angles to the magnetic meridian of the earth and in relatively moving the magnets so as to change the horizontal spacing between the poles while maintaining the poles relatively east and west one from the other.

10. The method of using four pairs of magnets to correct the magnetic field of a carrier of a compass at the compass, which consists in locating the magnets in pairs at ninety degrees separation about the pivotal axis of the compass and substantially equidistant from the compass so that opposite poles of different magnets in each pair can be brought into substantial coincidence or move away therefrom, in angularly aligning the carrier so that a vertical plane through two pairs of magnets at one hundred eighty degrees separation from each other is angularly out of the magnetic meridian, in simultaneously moving the magnets of said pairs with respect to each other to adjust the spacings between opposite poles of said first pairs while maintaining the poles at substantially the same distance from the compass needle until the compass reads correctly, in angularly aligning the carrier in position perpendicular to the first alignment and in similarly relatively moving the poles of intervening pairs of magnets so as to adjust the spacing between opposite poles of said magnets while maintaining substantially the same horizontal spacing of the poles of said intervening pairs of magnets from the compass.

11. In a device for neutralizing the magnetic field of the carrier of a compass at the compass with respect to a plane of the carrier through the compass, the plane being adapted to be alined east and west by alignment of the carrier, a pair of similar magnets, each movable about a center in one end and having poles at the free ends unlike and effectively neutralizing each other in one position of the magnets and means for simultaneously adjusting the magnets to separate the neutralized poles selectively in either of opposite directions causing reversal of flux flow with reversal of direction.

12. In a device for correcting field distortion of a carrier of a compass at the compass, a pair of similar magnets having pivot connection at unlike poles and means for effecting an angular adjustment between the magnets adapted to simultaneously oppositely adjust the angular spacing of the magnets while keeping the pivot of magnets substantially stationary.

13. In a device for correcting field distortion at a compass due to a magnetic field at the carrier of the compass, two relatively perpendicular sets of jointed magnets with the joints of one set in a fore and aft plane of the compass and the joints of the other set in an athwart plane of the compass, means for oppositely adjusting the free ends of the magnets of one set while maintaining the free ends of each jointed magnet continuously athwart one from the other and means for oppositely adjusting the free ends of the magnets of the other set while maintaining the free ends of each jointed magnet continuously fore and aft one from the other.

14. In a device for neutralizing the field of the carrier of a compass at the compass, in fore and aft and athwart planes of the carrier through the compass, two pairs of magnets located substantially at the same distance from the compass and laterally spaced from the athwart plane on opposite sides thereof, each pair comprising similar magnets having unlike inner poles substantially together in the fore and aft plane and unlike outer poles equidistant from the fore and aft plane and substantially equidistant from the athwart plane, means for oppositely adjusting the outer ends of the magnets of each pair and of both pairs simultaneously while maintaining the outer poles of each pair continuously equidistant from the fore and aft plane and continuously equidistant from the athwart plane, in combination with two other pairs of magnets, each pair comprising similar magnets having unlike inner poles together in the athwart plane and unlike outer poles equidistant from the athwart plane and equidistant from the fore and aft plane and other means for oppositely adjusting the outer ends of the magnets of each other pair in both other pairs simultaneously while maintaining the outer poles of each other pair continuously equidistant from the athwart plane and continuously equidistant from the fore and aft plane.

15. In a device for correcting field distortion at the carrier of a compass, a plurality of movable magnets comprising an interconnected system providing a pair of unlike poles on one side of a plane through the normal vertical axis of the compass and a pair of unlike poles on the opposite side of said plane and means for moving the magnets horizontally concurrently in either direction to bring the unlike poles of each pair close together to nullify their effects upon the field of the compass and subsequently to separate them in either direction to set up an external field to act upon the compass.

16. The method of using two pairs of magnets on the same side each pair of the normal axis of the compass, one pair located at ninety degrees distance angularly about the axis of the compass from the other for the purpose of correcting the magnetic field of the carrier of a compass at the compass which consists in placing the magnets to the unlike poles of one pair together to neutralize each other and subsequently progressively increasing the spacing of the unlike poles at one end each of the magnets of said pair to compensate the adjustment of the compass in one position of the carrier and in correspondingly placing the magnets to the unlike poles at one end each of the other pair of magnets to neutralizing position and subsequently progressively separating said unlike poles for adjustment of the compass in a second carrier position, separated ninety degrees from the first carrier position.

17. In a device for correcting field distortion at a compass, a pair of magnets movable substantially horizontally in closely adjacent planes toward and past each other, having opposite poles adjacent to substantially neutralize each other as they occupy intermediate position whereby they may neutralize or produce fields of opposite character progressively increasing as the poles are separated from each other and means for moving the magnets of the pair.

18. In a device for correcting field distortion at a compass, two pairs of magnets having opposite poles movable within planes substantially perpendicular to the normal compass axis, laterally toward and past each other, neutralizing each other in intermediate positions and reversing the effective flux from each pair as they pass each other, one pair being located at an angular distance of ninety degrees with respect to the other about the compass axis and separate means for moving the magnets of each pair toward and past each other.

JOHN L. H. HAND.